United States Patent [19]

Chick et al.

[11] 3,954,171

[45] May 4, 1976

[54] LINEARLY DISPOSED METHOD AND APPARATUS FOR ORIENTING ARTICLES IN A PRE-SELECTED END-TO-END POSITION

[75] Inventors: Robert K. Chick, Norwich; Ernest L. Edwards, Essex, both of Conn.

[73] Assignee: Monsanto Company, St. Louis, Mo.

[22] Filed: July 11, 1974

[21] Appl. No.: 487,587

[52] U.S. Cl. ............................... 198/246; 198/249; 198/268; 198/102
[51] Int. Cl.² ........................................ B65G 47/24
[58] Field of Search ............ 198/246, 248, 249, 263, 198/264, 265, 267, 268, 288, 76, 161, 162, 30, 241, 242, 243, 102, 278, 268, 254, 250, 262, 276, 283, 40; 221/173

[56] References Cited
UNITED STATES PATENTS

| | | | |
|---|---|---|---|
| 2,775,334 | 12/1956 | Jeremiah............................... | 198/265 |
| 3,101,832 | 8/1963 | Wyle et al............................ | 198/250 |
| 3,251,452 | 5/1966 | Conway et al...................... | 198/40 X |
| 3,307,678 | 3/1967 | McCollough et al. ............... | 198/267 |
| 3,425,530 | 2/1969 | Carter.................................. | 198/265 |
| 3,578,141 | 5/1971 | Sheehan............................... | 198/264 |

FOREIGN PATENTS OR APPLICATIONS

| | | | |
|---|---|---|---|
| 1,904,967 | 8/1970 | Germany ............................ | 198/288 |

*Primary Examiner*—Albert J. Makay
*Assistant Examiner*—James M. Slattery
*Attorney, Agent, or Firm*—Michael J. Murphy

[57] ABSTRACT

A linearly disposed method and apparatus for orienting articles such as bottles or the like in a pre-selected position, wherein bottles are fed onto a primary conveyor where a photoelectric cell-light source combination senses their orientation and, if needed, reorients the articles, preferably by an air blast which urges a part of it into contact with a secondary conveyor which is at a different relative speed from that of the primary conveyor, such speed differential serving to turn the improperly oriented bottle so as to bring it into the pre-selected position.

14 Claims, 5 Drawing Figures

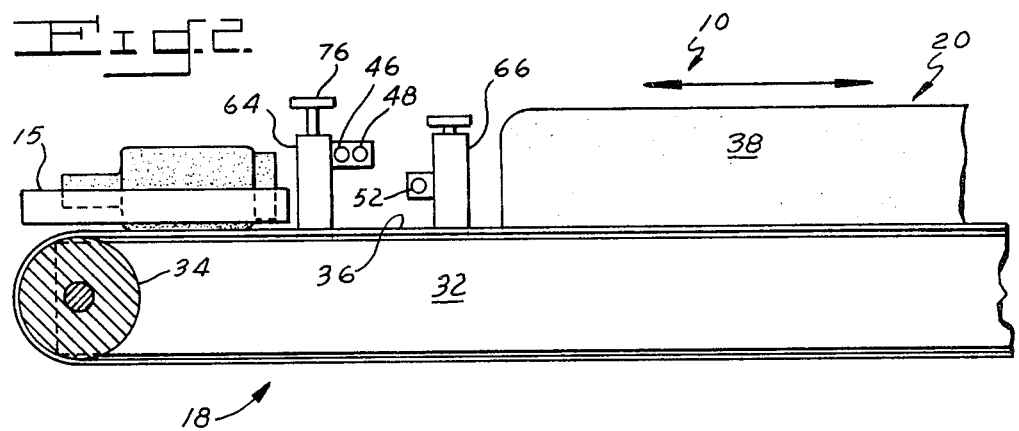
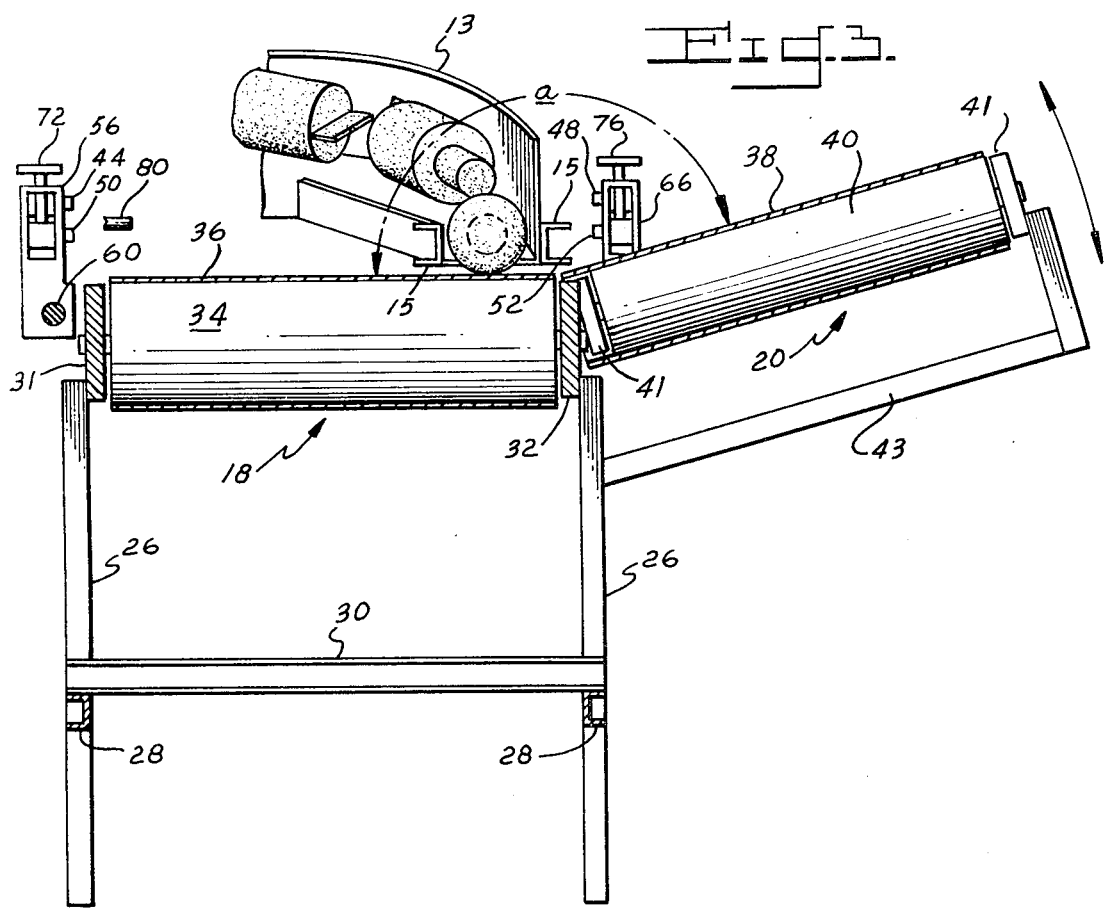

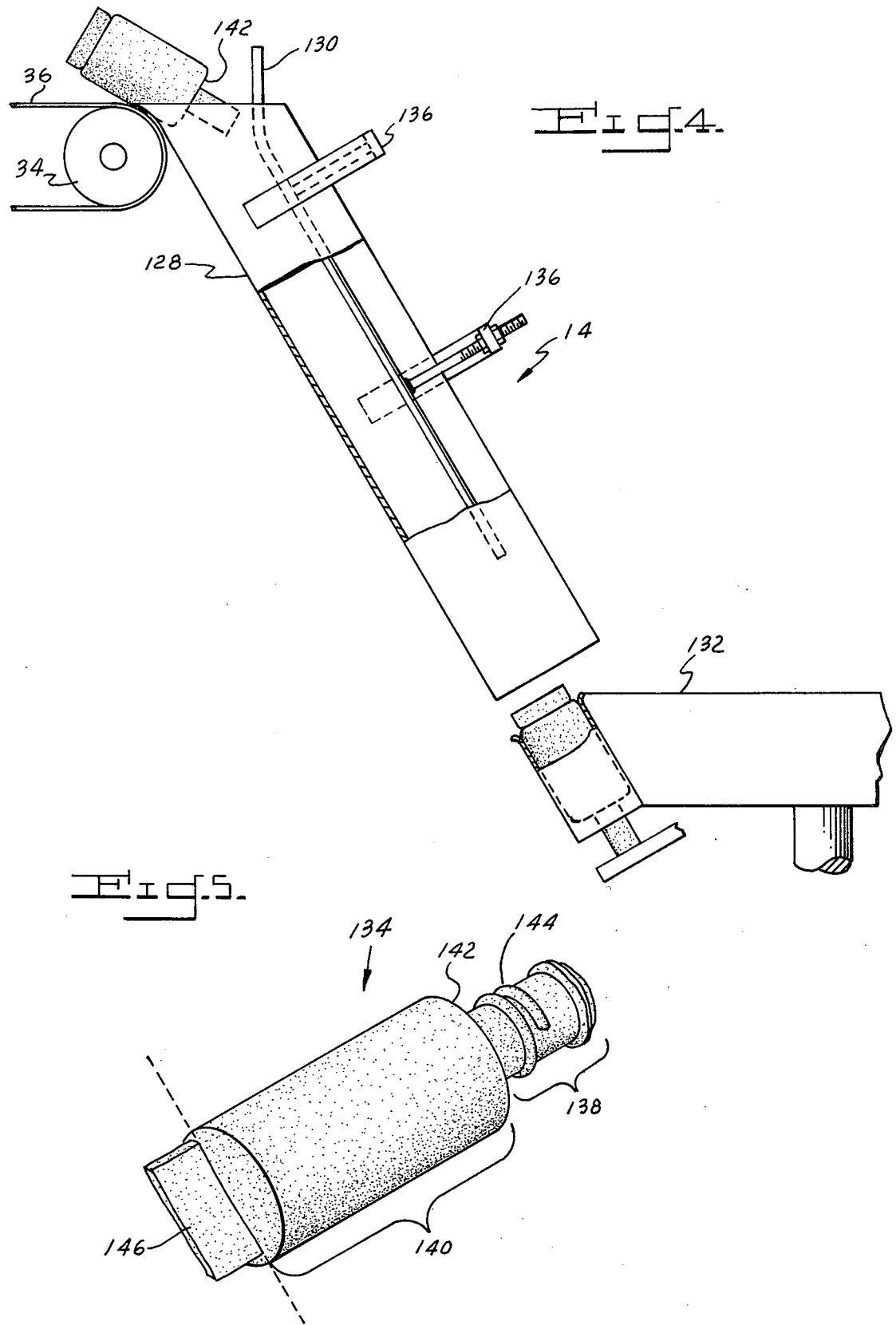

LINEARLY DISPOSED METHOD AND APPARATUS FOR ORIENTING ARTICLES IN A PRE-SELECTED END-TO-END POSITION

BACKGROUND OF THE INVENTION

The present invention relates to method and apparatus improvements for orienting articles such as bottles or the like which are randomly presented neck first or base first into either all neck first or base first positions.

U.S. Pat. No. 3,101,832 discloses an article orienting system using air blasts to flip improperly oriented bottles end over end on the spirally disposed surface of an upwardly inclined vibrating track conveyor. A light beam-photocell combination detects the orientation of the closely adjacent frequently abutting parts as they move along the track.

Though this system has been employed successfully, it is not without its deficiencies. In the disclosed system, the bottles are not under control while being turned by the dual air blasts and this frequently results in articles falling off the track or being incompletely rotated, the frequency of this often depending on bottle shape. Flipping bottles in the immediate vicinity of the detecting eyes often strike the eye support arms overlying the track and are deflected back to the bottom of the bowl or else reverted back to their initial improperly oriented position. The uncontrolled spacing between successive bottles which frequently results in no such space at all, often does not permit the system to reset after a flip signal such than an improperly oriented article abutting a preceding properly oriented one passes through undetected. Accordingly, the second orientation checking station at the top of the spiral track was ejecting a large percentage of the articles back to the bottom of the bowl for recycling, which, of course, adversely affects the capacity of the system.

BRIEF SUMMARY OF THE INVENTION

Now, however, improvements in article orienting systems have been developed which overcome these prior art deficiencies.

It is an object of the present invention to provide a method and apparatus for receiving randomly oriented bottles, i.e., either neck first or base first, and orienting them to either all neck first or all base first in end-to-end relationship, whether in finished or semi-finished form.

It is another object of the present invention to provide a linear discriminator which will positively orient all bottles directed to it without recycling of a misoriented bottle to the bottle feeding apparatus.

It is a further object of the present invention to provide a linear discriminator of the type hereinafter described for processing plastic bottles which is not affected by excess moil flash, neck ridges, tail orientation with respect to the bottle or tail length variation.

It is a still further object of the present invention to provide a linear discriminator which may be employed to positively feed downstream apparatus such as neck and tail trimming stations and the like at a stable rate without any substantial fluctuations in feeding frequency.

A specific object of the present invention to provide a bottle orienting system wherein spacing between successive articles after orienting is substantially the same as that on entering the system.

Other objects and advantages of the present invention will become apparent when considered in view of the following description and the drawings.

These and other objects are accomplished by the linear discriminator of the present invention which employs primary conveyor means moving at a first speed and secondary conveyor means having a different relative speed from that of the first conveyor means and disposed adjacent to the first conveyor means in juxtaposition thereto. The upstream end of the primary conveyor means is provided with feed means for articles such as bottles and discrimination means to determine either neck first or tail first orientation. The discrimination means includes article orienting means preferably comprising an air blast for urging a misoriented article into contact with the secondary conveyor means for reorienting the same as a result of the speed differential between the two conveyor means. Article rejection means is provided near the downstream end of the primary conveyor means and includes additional discrimination means for sensing the orientation of articles and removing those articles which are not properly oriented. Article removal means is provided adjacent the downstream end of said primary conveyor means.

The method of the invention comprises placing undesirably oriented articles in contact with adjacent surfaces having different relative speeds such that the undesirably oriented articles are turned as a result of such speed differential into pre-selected position.

BRIEF DESCRIPTION OF THE DRAWINGS

In describing the oberall invention, reference will made to the accompanying drawings wherein:

FIG. 2 is a partial, front elevation sectional view taken along the line 2—2 of FIG. 1;

FIG. 3 is a sectional view taken along the line 3—3 of FIG. 1;

FIG. 4 is a partial elevational view of bottle removal means for the apparatus of the present invention; and FIG. 5 is a perspective view of a typical bottle or the like which may be oriented by the apparatus of the present invention.

DESCRIPTION OF THE PREFERRED EMBODIMENT

Figure 1:
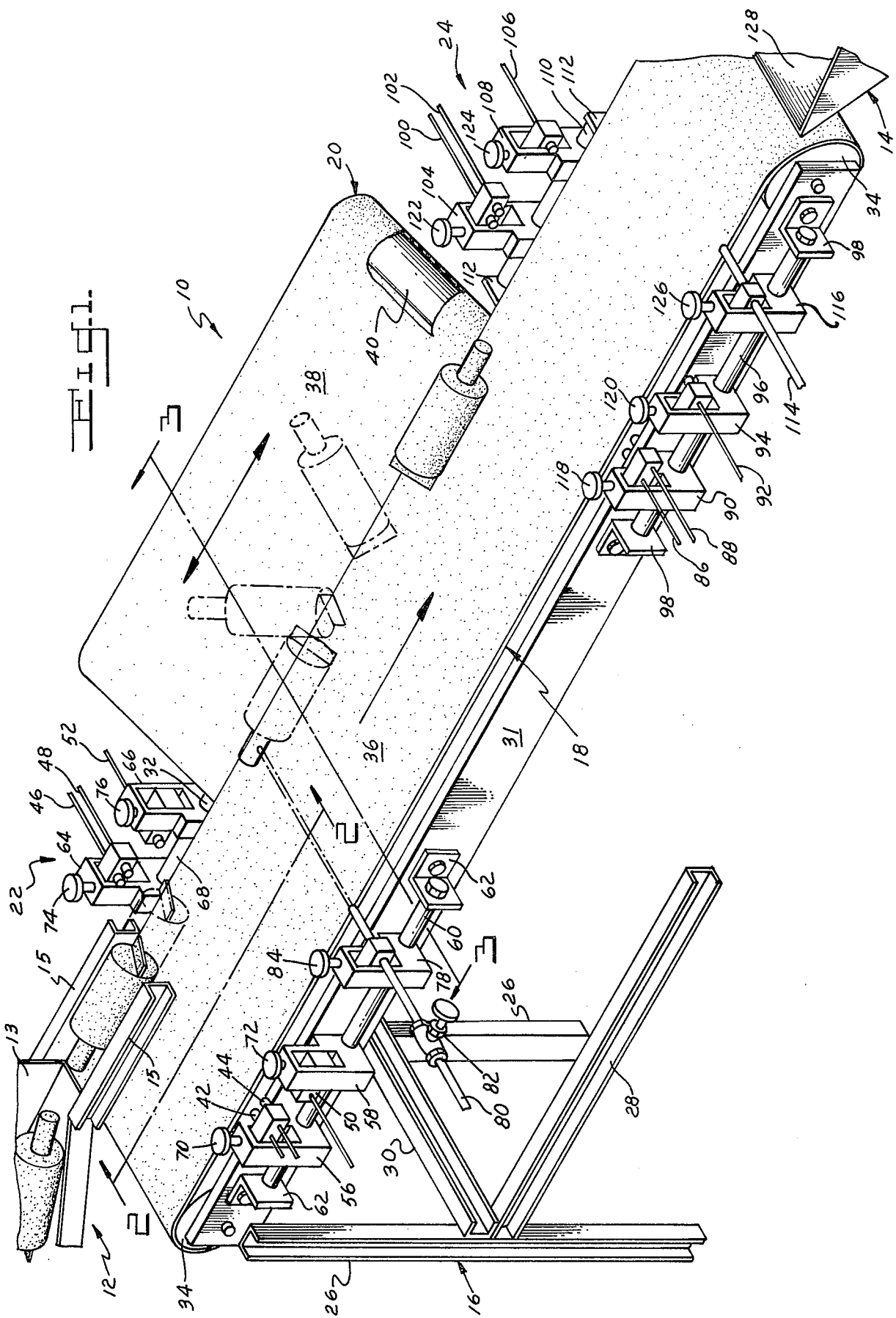
FIG. 1 is a perspective view, having parts broken away, of the apparatus of the present invention.

The linear discriminator of the present invention is generally indicated at 10 in FIG. 1. As shown, bottle feed means 12 comprising a feeding ramp 13 and guide rails 15 mounted above and adjacent the moving surface of belt 36, to be further described, is located upstream of the discriminator 10, while bottle removal means 14 is located downstream thereof. (See FIG. 4.)

In general, the discriminator comprises a support frame 16, primary and secondary conveyor means 18 and 20, respectively, discrimination means 22 and optional rejection means 24.

As best seen in FIGS. 1 and 3, the support frame 16 comprises a plurality of upstanding legs 26 braced by longitudinal and cross members 28 and 30, respectively. A pair of spaced parallel conveyor supports 31 and 32 are affixed to the uppermost portions of the legs 26 in the longitudinal direction. Rollers 34 are provided at each end of the apparatus 10 and are journaled into opposing sides of conveyor supports 31 and 32. A belt 36 or the like is tightly positioned about the rollers 34 in endless fashion. The belt 36 is driven by drive means (not shown) operatively connected to one or both of rollers 34 in the direction shown by the arrow.

The secondary conveyor means 20 is positioned adjacent the primary conveyor means 18 in juxtaposition thereto and comprises a reorienting member such as belt 38 or the like tightly disposed about rollers 40 which are journaled into roller supports 41 affixed to tiltable frame 43. As shown best in FIG. 3, the secondary conveyor means 20 is pivotable in a plane about its side that is adjacent to the primary conveyor means 18. The angle a through which the conveyor means 20 may be pivoted runs from essentially 180° (flat) to about 135°. As in the case of the primary conveyor means 18, the belt 38 is driven by conventional independent drive means (not shown) operatively connected to one or both of rollers 40. Such drive may be either forward or backward as indicated by the arrows in FIG. 1 or belt 38 could be stationary.

With reference primarily to FIGS. 1, 2 and 3, it will be noted that the discrimination means 22 is disposed at the upstream end of the linear discriminator 10 just downstream of bottle feed means 12. As shown, the discrimination means comprises first or shoulder sensing means, such as photoelectric cells 46 and 48, with corresponding light sources 42 and 44, and second or neck sensing means, such as photoelectric cell 52 and corresponding light source 50. As will be noted, photoelectric cells 42 and 44 are carried on bracket 56, while photoelectric cell 50 is carried on bracket 58. Both of said brackets are slidably disposed for longitudinal adjustment parallel to the travel of the belt 36 on rod 60, which is affixed at each end to support 31 by angle irons 62. Light sources 46 and 48, and 52 are likewise carried by brackets 64 and 66, respectively, and are slidably disposed on rod 68 which is affixed to support bar 32 in similar fashion (not shown) to that of rod 60. Additionally, each photoelectric cell and light source is movable up and down in a plane perpendicular to conveyor means 18 by adjustment screws 70, 72, 74 and 76. The significance of parallel and perpendicular adjustment of the sensing means with regard to the conveyor belt will be explained hereafter.

Though the photocell-light source combination is the preferred form of discrimination means, alternative forms could be used such as those utilizing an ultransonic device, or a laser beam, or a microswitch in the path of advancing movement of the articles, or an optical (camera) system.

A third bracket 78 is also slidably disposed on rod 60 and is employed to carry and position bottle orienting means, which, in the illustrated embodiment, is in the form of air line 80. The air line 80 contains valve 82 to control the intensity of the air blast and is also adjustable in a vertical plane by adjustment screws 84. Such bottle orienting means alternatively could be a mechanical arrangement, such as a fast-acting reciprocable arm.

The optional rejection means 24 is disposed downstream of the discrimination means 22 towards the end of belt 36 and comprises the same essential elements as the discrimination means. That is, shoulder and neck sensing means, such as photoelectric cells 86 and 88 carried by bracket 90 and photoelectric cell 92 carried by bracket 94, are slidably disposed on rod 96 which is affixed at each end to support 31 by angle irons 98. Corresponding light sources 100 and 102 are carried by bracket 104, while light source 106 is carried by bracket 108. Bracket 104 and 108 are slidably disposed on rod 110 affixed to support 32 by angle irons 112. The rejection means also include bottle ejection means in the form of air line 114 carried by bracket 116, which is slidably disposed on rod 96. Each bracket is provided with adjustment screws 118, 120, 122, 124 and 126 for the movement of each device in a plane perpendicular to the conveyor belt 36.

As depicted, the shoulder sensing means in both the discrimination and rejection means is comprised of the combination of two light sources and photocells disposed side by side. While one photocell-light source is probably sufficient, the use of two at each point prevents the unwanted actuation of the shoulder sensing means by the presence of excess moil or tail flash or neck ridges on a bottle.

With reference primarily to FIG. 4, it will be noted that the bottle removal means 14, which is positioned adjacent the downstream end of belt 36, comprises an angled, wide mouth chute 128 with a guide 130 associated therewith. The chute, which receives bottles from the end of conveyor belt 36, directs the same to an indexing trim station 132 or the like for further physical treatment thereof, such as that shown in FIG. 5. The guide 130 is adjustable via adjustment screws 136 so as to accommodate different size bottles.

Referring to FIG. 5, a typical bottle is shown at 134. As will be noted, the bottle 134 has a longitudinal axis extending through and parallel to neck portion 138 and body portion 140, such bottle having a central short cr radial axis perpendicular to the longitudinal axis. The junction of the neck 138 and body 140 provides a shoulder 142. Additionally, the bottle 134 may have screw threads 144 on the neck portion 138 and tail flash 146 on the bottom thereof. Such is the form of a semi-finished plastic bottle coming from a typical bolt molding operation.

The articles with which the linear discriminator of the invention is operable can vary widely. In general, such articles must have a distinguishable characteristic along their length such as a variation in vertical dimension as existing at the shoulder 142 of bottle 134, or a variation in material composition such as density. Lightweight plastic bottles 134 have been successfully handled with the system of the invention and are preferred.

OPERATION

In order to prepare the apparatus of the present invention for operation, it is necessary to adjust the discrimination means 22 and the optional rejection means 24 so that they are able to scan the physical dimensions of the bottles which are fed to the apparatus.

In adjusting the discrimination means 22 to scan a bottle 134, the bottle is placed on the belt 36 with the neck 138 heading downstream. Neck sensing means is adjusted by positioning light source 50 via screw 72 so that the center of its beam strikes the bottle 134 at the center line of the neck 138. Photoelectric cell 52 is adjusted via screw 76 so as to align with light source 50.

Next, the shoulder sensing means is adjusted by positioning light sources 42 and 44 via screw 70 so that the beams thereof pass just over the neck 138 of the bottle 134, but not over the body 140 thereof. Corresponding photoelectric cells 46 and 48 are adjusted via screw 74 so as to be in alignment with light sources 42 and 44. At this point, the relative distance between the two sensing means is adjusted as follows: a bottle having its neck heading downstream is pushed into a position where the front edge of the neck 138 intersects the beam of the neck sensing means. With the bottle held in this position, the shoulder sensing means is adjusted longitudinally so that the beam of light source 42 strikes the shoulder of the bottle 134, but not the beam of light source 44.

With the two sensing means so adjusted, they are connected to a logic circuit which is also connected to the bottle orienting means, i.e., air blast. While the circuitry of the logic circuit is not explained here, its operation should be clear to those skilled in the art in view of the following operational explanation. Articles such as bottles 134 having random end-to-end orientation are sequentially fed lengthwise to linear discriminator 10 by feed means 12 at a linear rate somewhat slower than the linear speed of belt 36 of the primary conveyor means 18 in order to insure spacing between consecutive bottles. Discrimination means 22, generally speaking, senses the orientation of each successively presented bottle as it advances linearly toward bottle removal means 14, allows those bottles having the preselected orientation to proceed without alteration while detecting those having undesired orientation for action by the bottle orienting means. If a bottle approaches the discrimination means in a desired neck-first position, the first sensing means to be actuated is the neck sensing means, i.e., photocell 52 and light source 50, by neck 138. At approximately the same instant, the light source 42 and photocell 46 of the shoulder sensing means is also actuated by the shoulder 142 of the bottle. This, of course, will be immediately followed by the actuation of light source 44 and photocell 48. In this instance, the air blast from air line 80 will not be activated by the logic circuit.

If, on the other hand, a bottle 134 advances along the conveyor belt 36 with the neck 138 facing upstream, the shoulder sensing means, i.e., both photocells and light source, will be actuated before the neck sensing means is actuated. In this situation, the circuit logic of the discrimination means will initiate an air blast from air line 80, which is electrically activated by the neck passing photocell 50 and light source 52. The air blast, which is positioned so as to strike the undesirably oriented, backward traveling bottle just before the neck 138 passes its position, urges the end of such article containing the neck partially onto the flat surface of reorienting belt 38 which is traveling at a different relative speed from that of belt 36 which, in the illustrated embodiment, is somewhat higher than that of belt 36. In such position, a portion of the undesirably oriented article simultlaneously rests on each of belts 36 and 38. The difference between the speeds of belt 36 and belt 38 and the angle of tilt between the two belts will cause the bottle to turn 180° while the overall advancing movement of the bottle in contact with the corresponding advancing belt surfaces continues, so that the neck of the bottle eventually faces downstream, the desired preselected orientation. This turning operating is illustrated in FIG. 1 by the bottle shown in phantom and occurs in a plane generally parallel to the flat surface of belt 38 about the central, short axis of the bottle, i.e. that axis perpendicular to the longitudinal axis.

The orientation of all bottles passing rejecting means 24 is monitored by the latter to determine whether they are in the pre-selected neck-first position. If by chance, a bottle is not oriented by the discrimination means when it should be, the bottle rejection means, which is set up in exactly the same manner as the discrimination means, will be actuated and the improperly oriented bottle will be rejected by blowing it off the conveyor belt 36 via an air blast from air line 114. As should be clear, properly oriented bottles are merely carried by the conveyor belt 36 without action by the discrimination or rejection means and dumped neck first into chute 128 from which they are directed to the indexing trim station 132 for the removal of the tail flash 146.

Various modifications and alterations will be readily suggested to persons skilled in the art. It is intended therefore, that the foregoing be considered as exemplary only and that the scope of the invention be ascertained from the following claims.

What is claimed is:

1. A linear discriminator for orienting articles such as bottles in a pre-selected, end-to-end position, said linear discriminator comprising primary conveyor means moving at a first speed, means for feeding said bottles onto said primary conveyor means, secondary conveyor means having a different relative speed from said primary conveyor means, said secondary conveyor means being disposed adjacent to said primary conveyor means in juxtaposition thereto, discrimination means for sensing the orientation of said articles and article orienting means for uring improperly oriented articles into contact with said secondary conveyor means in response to a signal from said discrimination means, whereby said improperly oriented articles are turned as a result of the speed differential between the two conveyor means.

2. The linear discriminator of claim 1 wherein said primary and secondary conveyor means are conveyor belts.

3. The linear discriminator of claim 2 wherein said discrimination means comprises first sensing means and second sensing means, said first sensing means including at least one photoelectric cell and a light source combination disposed on either side of said primary conveyor belt for sensing the body of an article, said second sensing means including a photoelectric cell and a light source combination disposed on either side of said primary conveyor belt downstream of said first sensing means for sensing the neck of an article 4. The linear discriminator of claim 3 wherein said article orienting means is an air blast responsive to said first and second sensing means.

5. The linear discriminator of claim 4 wherein said photoelectric cell and light source combination of said second sensing means is disposed above said primary conveyor belt so that the beam thereof intersects the center line of said article and wherein said photoelectric cell and light source combination of said first sensing means is disposed above said primary conveyor belt so that the beam thereof only intersects the shoulder of said article.

6. The linear discriminator of claim 2 wherein said secondary conveyor belt is pivotable in a plane about its side adjacent to said primary conveyor belt.

7. The linear discriminator of claim 1 further including article rejection means disposed downstream of said discrimination means.

8. The linear discriminator of claim 7 wherein said article rejection means comprises shoulder sensing means, neck sensing means and article ejection means for urging improperly oriented bottles off said primary conveyor means.

9. A linear discriminator for orienting bottles or the like to a pre-selected, end-to-end position, said linear discriminator comprising a primary conveyor belt moving at a first speed, means for feeding said bottles onto said primary conveyor belt, a secondary conveyor belt moving at a speed greater than said primary conveyor belt, said secondary conveyor belt being disposed adjacent to said primary conveyor belt in juxtaposition thereto, discrimination means for sensing the orientation of said bottles as they are fed onto said primary conveyor belt, bottle orienting means for uring improperly oriented bottles into contact with said secondary conveyor belt in response to a signal from said discrimination means, whereby said improperly oriented bottles are turned as a result of the speed differential between said two conveyor belts, and bottle rejection means disposed downstream of said discrimination means.

10. The linear discriminator of claim 9 wherein said discrimination means comprises first sensing means and second sensing means, said first sensing means including a pair of photoelectric cells in side-by-side relation disposed on one side of said primary conveyor belt and a pair of light sources disposed in side-by-side relation on the other side of said primary conveyor belt, said second sensing means including a photoelectric cell and a light source combination disposed on either side of said primary conveyor belt downstream of said first sensing means.

11. A method for orienting articles such as bottles in a pre-selected end-to-end position which comprises:
  A. sequentially feeding such articles having random end-to-end orientation lengthwise to a horizontally moving surface;
  B. sensing the orientation of successive articles as they advance linearly on the surface;
  C. allowing those articles having pre-selected orientation to proceed without alteration;
  D. urging undesirably oriented articles partially onto the flat surface of an adjacent reorienting member disposed in the same direction as and having a different relative speed from said horizontally moving surface such that portions of such undesirably oriented articles simultaneously rest on the horizontally moving surface and reorienting member; and
  E. continuing said advancing movement while said undesirably oriented articles are in contact with both the reorienting member and moving surface in order to turn such undesirably oriented articles in a plane generally parallel to the flat surface and orient them in the pre-selected position as a result of such speed differential.

12. The method of claim 11 including the additional steps of:
  A. monitoring the orientation of all articles after step (E) to determine whether all articles are in said pre-selected position; and
  B. rejecting those monitored articles which are not in such pre-selected position.

13. The method of claim 11 wherein the articles are bottles and turning is about the central axis thereof perpendicular to the turning plane.

14. In a method of orienting plastic bottles in a pre-selected end-to-end position which includes:
  sensing the orientation of advancing bottles having a random end-to-end relationship; and
  reorienting those having undesirable orientation while allowing those having the pre-selected orientation to proceed without change;
  the improvement in said method whereby reorienting is accomplished without interrupting advancing movement of the bottles, which improvement comprises, in combination, the step of:
  urging undesirably oriented bottles on a linearly advancing conveyor partially onto the flat surface of an adjacent reorienting conveyor moving at a greater speed than and in the same direction as that of the advancing conveyor in order, as a result of such speed differential, to turn such bottles about their short axes in a plane generally parallel to the surface of the reorienting conveyor and bring them into the pre-selected orientation while continuing said advancing movement.

* * * * *